(12) United States Patent
Hsu et al.

(10) Patent No.: US 9,007,419 B2
(45) Date of Patent: Apr. 14, 2015

(54) AUDIOVISUAL APPARATUS FOR REDUCING ECHO

(71) Applicant: Azurewave Technologies, Inc., New Taipei (TW)

(72) Inventors: Chi-Hsing Hsu, New Taipei (TW); Ming-Shun Chen, New Taipei (TW)

(73) Assignee: Azurewave Technologies, Inc., New Taipei (TW)

( * ) Notice: Subject to any disclaimer, the term of this patent is extended or adjusted under 35 U.S.C. 154(b) by 191 days.

(21) Appl. No.: 13/739,924

(22) Filed: Jan. 11, 2013

(65) Prior Publication Data
US 2014/0125756 A1    May 8, 2014

(30) Foreign Application Priority Data
Nov. 7, 2012    (TW) ............................. 101221542 U

(51) Int. Cl.
*H04N 7/14*   (2006.01)
*G09G 3/20*   (2006.01)
*H04M 9/08*   (2006.01)

(52) U.S. Cl.
CPC ............. *H04N 7/148* (2013.01); *G09G 3/2096* (2013.01); *H04M 9/08* (2013.01)

(58) Field of Classification Search
None
See application file for complete search history.

(56) References Cited

U.S. PATENT DOCUMENTS

| | | | |
|---|---|---|---|
| 2013/0109317 A1* | 5/2013 | Kikuchi et al. | 455/41.2 |
| 2014/0111598 A1* | 4/2014 | Paxinos et al. | 348/14.04 |

* cited by examiner

Primary Examiner — Maria El-Zoobi
(74) Attorney, Agent, or Firm — Li & Cai Intellectual Property (USA) Office

(57) ABSTRACT

The present disclosure relates to an audiovisual apparatus, which includes an audiovisual capturing unit, an audiovisual broadcast unit, and a transmission cable module. The two ends of the transmission cable module are respectively connected to the audiovisual capturing unit and the audiovisual broadcast unit. The transmission cable module has a video cable group for transmitting video signals and an audio cable group for transmitting audio signals suitable for reducing echo. The audio cable group includes a cable for providing a digital clock for the audio signal, a cable for providing a clock for the left right channel switching audio signal, a cable for inputting serial audio signal, and a cable for outputting serial audio signal. With this arrangement, the audio signals captured by the audiovisual capturing unit and transmitted by the transmission cable module to the audiovisual broadcast unit can be effectively removed of echo.

9 Claims, 7 Drawing Sheets

AUDIOVISUAL APPARATUS FOR REDUCING ECHO

BACKGROUND OF THE INVENTION

1. Field of the Invention

The present disclosure relates to an audiovisual apparatus; in particular, to an audiovisual apparatus capable of reducing echo.

2. Description of Related Art

With the advancement of technology, televisions are no longer merely devices for transmission of signals in a single direction. Equipping televisions with audiovisual capturing devices is a growing trend. In other words, televisions equipped with audiovisual capturing devices are capable of handling two-way communication through the use of internet.

However, the treatment of echo in the process of using television and audiovisual capturing device for two-way communication is an important problem to be solved. Of the current solutions, Skype employs a software design to reduce echo. This method for reducing echo not only requires an immense amount of research, but also cannot be applied on other communication software (such as QQ).

Hence, the present inventor believes the above mentioned disadvantages can be overcome, and through devoted research combined with application of theory, finally proposes the present invention which has a reasonable design and effectively improves upon the above mentioned disadvantages.

SUMMARY OF THE INVENTION

The object of the present disclosure is to provide an audiovisual apparatus capable of reducing echo. The audiovisual apparatus uses a structural design of the hardware to reduce the echo between the audiovisual capturing device and the audiovisual broadcast device.

The other object of the present disclosure is to provide a single or dual chord transmission cable module.

The embodiment of the present disclosure provides an audiovisual apparatus for reducing echo which includes: an audiovisual capturing device which has a video capturing unit, an audio capturing unit, a signal processor module, and an output port, wherein the video capturing unit and the audio capturing unit are electrically connected to the signal processor module, and the signal processor module is electrically connected to the output port; an audiovisual broadcast device which has a video display, an audio broadcast unit, and an input port, wherein the audio broadcast unit and the video display are respectively coupled to the input port; and a transmission cable module, which has two ends respectively installed at the output port of the audiovisual capturing device and the input port of the audiovisual broadcast device, a video cable group for transmitting video signals, and an audio cable group for transmitting audio signals suitable for reducing echo. The video cable group includes a cable for transmitting electric power, a cable for transmitting differential signals, and a ground cable. The audio cable group includes a cable for providing a digital clock for the audio signal, a cable for providing a clock when the audio signal switches between a left audio channel and a right audio channel, a cable for inputting serial audio signal, and a cable for outputting serial audio signal.

Ideally, the signal processor module has a digital signal processor and a codec electrically connected to each other. The digital signal processor is electrically connected to the video capturing unit. The codec is electrically connected to the audio capturing unit. The digital signal processor and the codec are coupled to the output port.

Ideally, the output port has an integrated output socket, and the input port has an integrated input socket. The transmission cable module has an integrated transmission cable, which includes the video cable group and the audio cable group. The two ends of the transmission cable module are respectively plugged to the integrated output socket and the integrated input socket.

Ideally, the output port has a video output socket and an audio output socket, the input port has a video input socket and an audio input socket, and the transmission cable module has a video transmission cable and an audio transmission cable. The video transmission cable includes the video cable group and two ends respectively plugged to the video output socket and the video input socket. The audio transmission cable includes the audio cable group and two ends respectively plugged to the audio output socket and the audio input socket.

In summary of the above, the embodiment of the present disclosure provides an audiovisual apparatus for reducing echo. The effect of reducing echo is achieved by applying the audio cable group of the transmission cable module to provide a digital clock for the audio signal, a clock for the left right channel switching audio signal, input serial audio signal, and out serial audio signal.

Moreover, according to demand, the transmission cable module can be an integrated single chord, or a dual chord with a video transmission cable and an audio transmission cable.

In order to further the understanding regarding the present invention, the following embodiments are provided along with illustrations to facilitate the disclosure of the present invention. However the illustrations serve as references only, and are not meant to define the scope of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
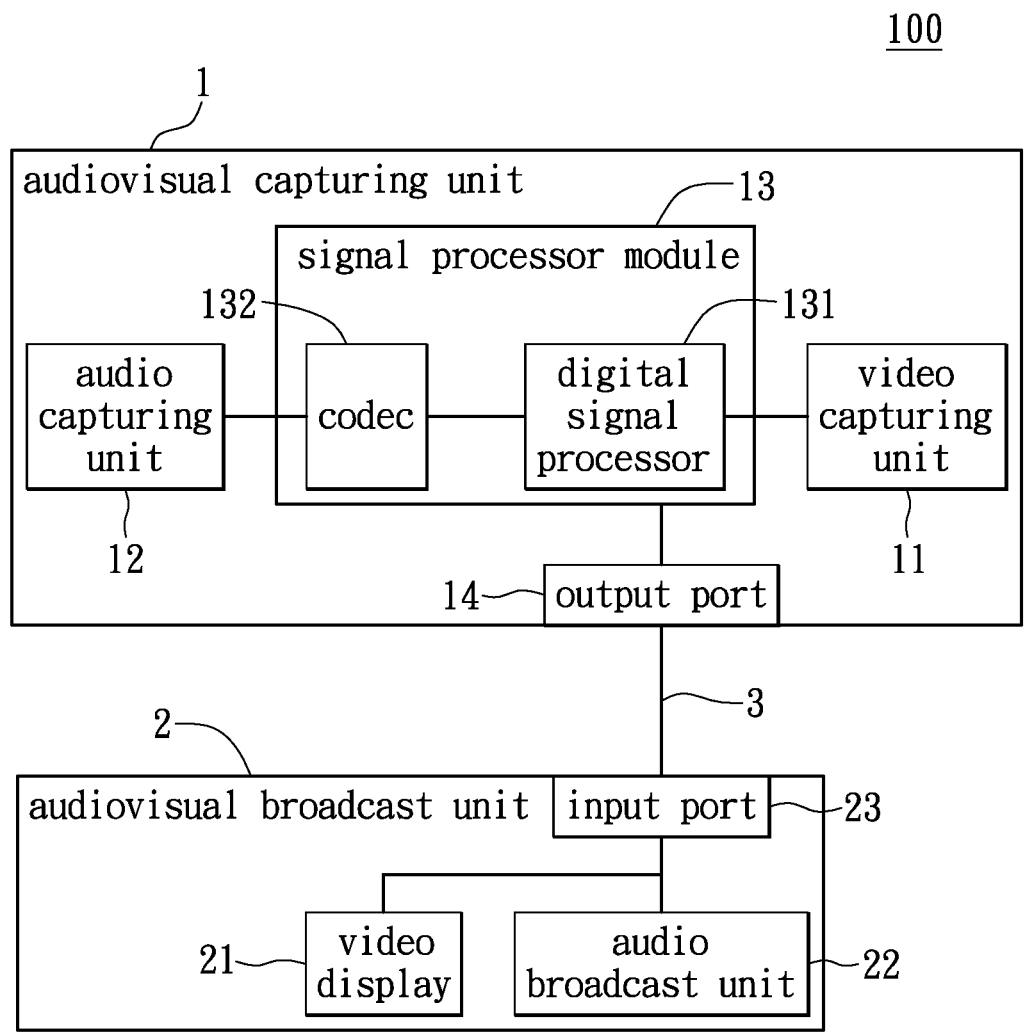
FIG. 1 shows a schematic functional diagram of an audiovisual apparatus for reducing echo of the present disclosure.

Referring to FIG. 1, the present disclosure provides an audiovisual apparatus 100 for reducing echo, which includes an audiovisual capturing device 1, an audiovisual broadcast device 2, and a transmission cable module 3 connecting the audiovisual capturing device 1 and the audiovisual broadcast device 2.

The audiovisual capturing device 1 can be used to capture video and audio signals, which are transmitted by the transmission cable module 3 to the audiovisual broadcast device 2 with a reduction in echo.

The following examples embody without defining in a limiting fashion the audiovisual apparatus 100 for reducing echo of the present disclosure:

First Embodiment

Figure 2:
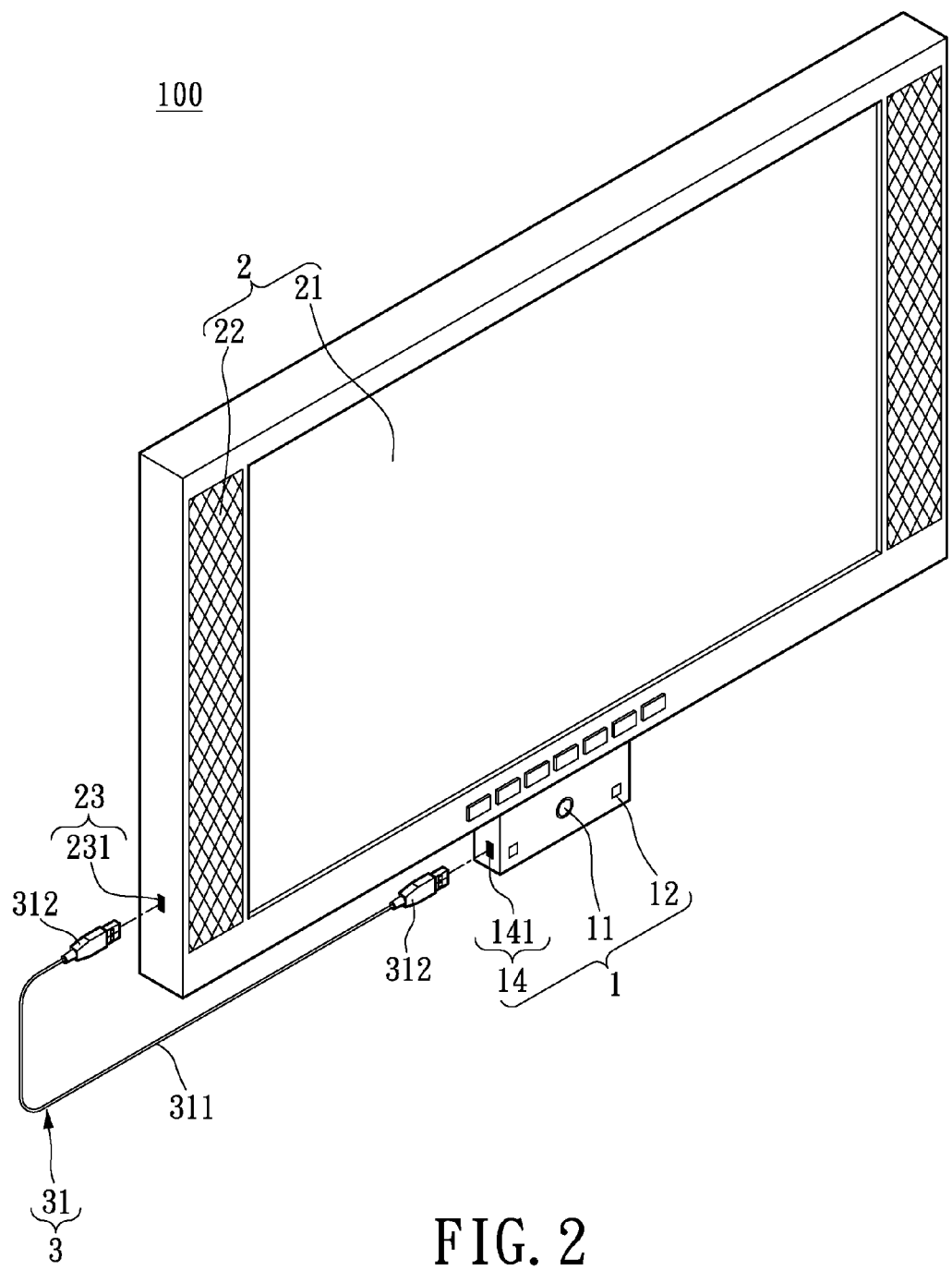
FIG. 2 shows a perspective schematic diagram of an audiovisual apparatus for reducing echo of the present disclosure according to a first embodiment.
Figure 3:
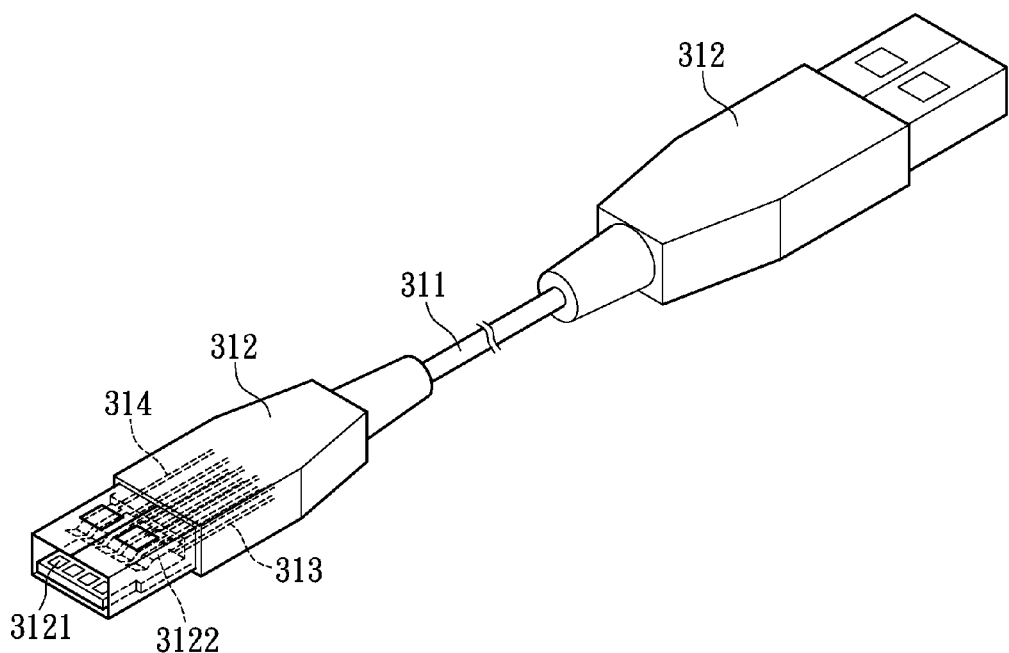
FIG. 3 shows a partial perspective schematic diagram of an audiovisual apparatus for reducing echo of the present disclosure according to a first embodiment.

FIG. 1, FIG. 2 and FIG. 3 illustrate the first embodiment of the present disclosure. FIG. 2 is a schematic perspective diagram of the present embodiment. FIG. 3 is a partial schematic perspective diagram of the present embodiment.

The present embodiment describes an audiovisual apparatus 100 for reducing echo, which includes an audiovisual capturing device 1, an audiovisual broadcast device 2, and a transmission cable module 3.

In the present embodiment, the audiovisual capturing device 1 is exemplified by a recording device with sound recording ability, and the audiovisual broadcast device is exemplified by a television. However, practical implementations of the present disclosure are not limited therein.

The audiovisual capturing device 1 has a video capturing unit 11 for capturing video signals, an audio capturing unit 12 for capturing audio signals, a signal processor module 13, and an output port 14.

Moreover, the video capturing unit 11 and the audio capturing unit 12 are electrically connected to the signal processor module 13, which is in turn electrically connected to the output port 14.

For example, the video capturing unit 11 can be a complementary metal-oxide semiconductor (CMOS), and the audio capturing unit 12 can be a microphone.

The signal processor module 13 has a digital signal processor 131 (DSP) and a codec 132. The digital signal processor 131 is electrically connected to the video capturing unit 11. The codec 132 is electrically connected to the audio capturing unit 12. The digital signal processor 131 and the codec 132 are coupled to the outlet port 14.

In the present embodiment, the output port 14 is an integrated output socket 141. It bears mentioning that the method by which the integrated output socket 141 is coupled to the digital signal processor 131 and the codec 132 can be adjusted to the designer's needs.

For example, the integrated output socket 141 can be merely electrically connected to the digital signal processor 131; alternatively, the integrated output socket 141 can be respectively electrically connected to the digital signal processor 131 and the codec 132.

The audiovisual broadcast unit 2 has a video display 21, an audio broadcast unit 22, and an input port 23. A television screen serves as the video display 2, while the speakers on the television serve as the audio broadcast unit 22. The video display 21 and the audio broadcast unit 22 are separately coupled to the input port 23. The input port 23 of the present embodiment is an integrated input socket 231.

The two ends of the transmission cable module 3 are respectively installed at the output port 14 of the audiovisual capturing device 1, and the input port 23 of the audiovisual broadcast unit 2, thereby transmitting signals between the audiovisual capturing device 1 and the audiovisual broadcast device 2.

The transmission cable module 3 of the present embodiment is an integrated transmission cable 31, the two ends of which are respectively plugged to the integrated output socket 141 and the integrated input socket 231.

In further detail, the integrated transmission cable 31 has an insulating coat 311, two plugs 312, a video cable group 313, and an audio cable group 314.

The two ends of the insulating coat 311 are respectively connected to the two plugs 312, each of which has a first endpoint interface 3121 and a second endpoint interface 3122. Namely, the endpoints in each plug 312 form two rows overall, wherein the second endpoint interface 3122 has more endpoints than the first endpoint interface 3121 does.

The video cable group 313 and the audio cable group 314 are enclosed by the insulating coat 311. The two ends of the video cable group 313 are respectively connected to the first endpoint interfaces 3121 of the two plugs 312. The two ends of the audio cable group 314 are respectively connected to the second endpoint interfaces 3122 of the two plugs 312.

More specifically, the video cable group 313 can transmit video signals. The video cable group 313 includes sequentially a cable for transmitting electric power, a cable for transmitting differential signals, and a ground cable.

It bears mentioning that the above mentioned arrangement sequence of the video cable group 313 is ideal but not limited thereto in practical applications.

Moreover, the audio cable group 314 can transmit audio signals and reduce echo. In further detail, the audio cable group 314 sequentially includes a cable for providing a digital clock for the audio signal, a cable for providing a clock when the audio signal switches between a left audio channel and a right audio channel, a ground cable, a cable for inputting serial audio signal, and a cable for outputting serial audio signal.

It bears mentioning that the above mentioned arrangement sequence of the audio cable group 314 is ideal but not limited thereto in practical applications. Moreover, the audio cable group 314 has more cables than the video cable group 313 does in this particular embodiment but it need not be the case.

Therefore, the two plugs 312 of the integrated transmission cable 31 can respectively be plugged to the integrated output socket 141 and the integrated input socket 231, thereby connecting the audiovisual capturing device 1 and the audiovisual broadcast unit 2.

In summary, the audiovisual apparatus 100 for reducing echo utilizes the audio cable group 314 of the integrated transmission cable 31 to serially transmit two groups of signals (example, left and right channels).

Moreover, since the audio cable group 314 of the integrated transmission cable 31 transmits data signals and clock signals separately, and the proximal and distal signals are separated by dividing the serial stream, the serial streams can be further processed to reduce the effect of echo (for example, removing distal audio signals from proximal audio signal, to remove echo from the proximal audio signal).

For example, if user A and user B both use the audiovisual apparatus 100 to communicate with each other, user A hears the sound of user B as broadcasted by the audio broadcast unit 22.

When user A speaks, the audio capturing unit 12 at the end of the user A captures the sound of user A and the sound of the user B broadcasted by the audio broadcast unit 22, transmits the sound of user A and the sound of user B by the audio cable group 314 to the audiovisual broadcast unit 2, specifically removes the sound of user B, and then transmits the sound to the end of user B where it is broadcasted by the audio broadcast unit 22 of user B.

At this moment, user B will only hear the sound made by user A (namely the echo is effectively removed), and vice versa (user A only hears the sound made by user B).

Additionally, the above mentioned implementation of the audiovisual apparatus 100 for reducing echo is achieved by respectively plugging the two plugs 312 of the integrated transmission cable 31 into the integrated output socket 141 of the audiovisual capturing unit 1 and the integrated input socket 231 of the audiovisual broadcast unit 2.

Figure 4:
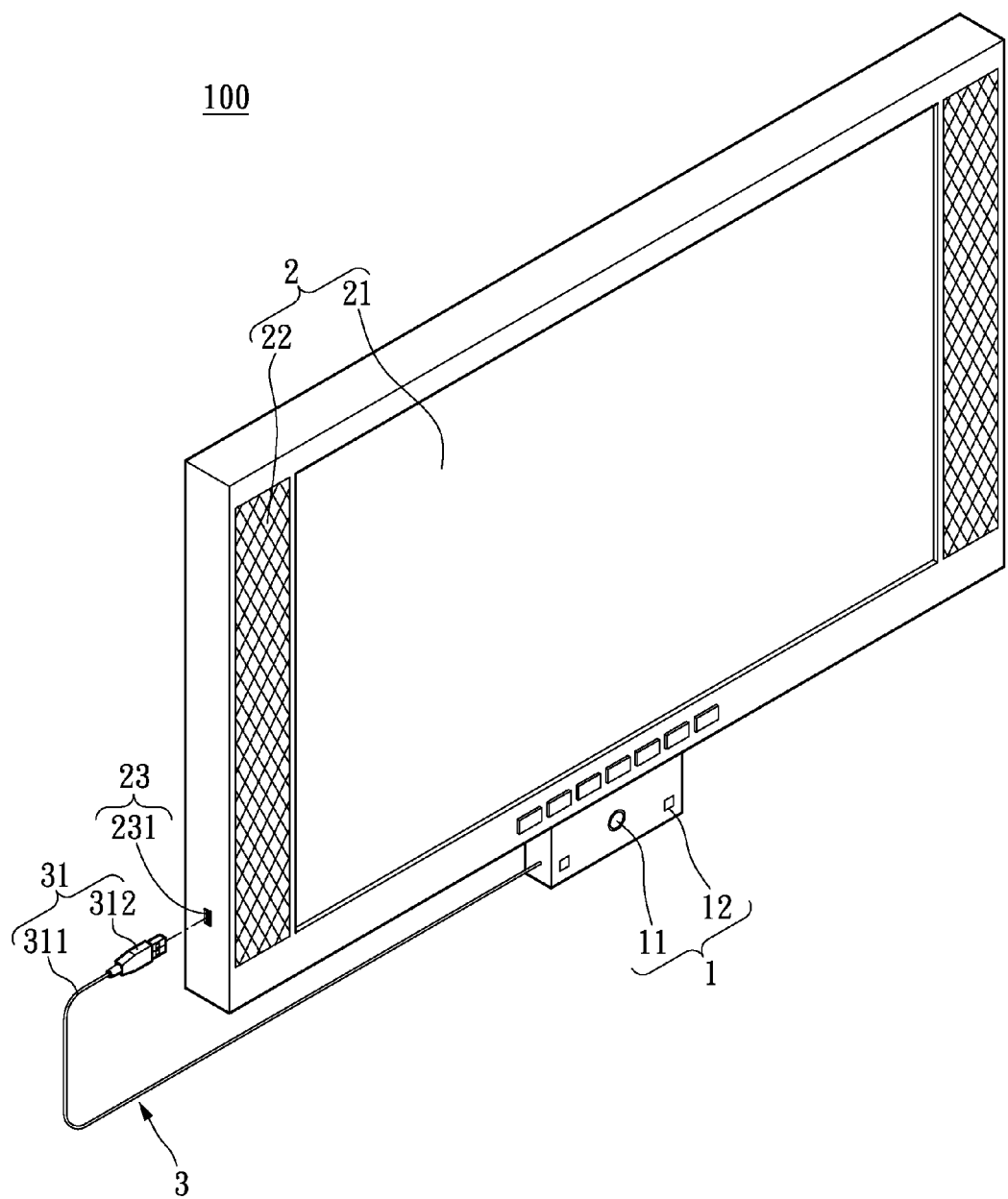
FIG. 4 shows a perspective schematic diagram of an audiovisual apparatus for reducing echo of the present disclosure according to a first embodiment under another implementation.

However in practical application, the integrated transmission cable 31 may alternatively have only one plug 312 as shown in FIG. 4 for plugging into the integrated input socket 231 of the audiovisual broadcast unit 2, and have the other ends directly fixedly connected to the audiovisual capturing unit 1 (namely, the integrated transmission cable 31 and the audiovisual capturing unit 1 are a single structure).

Similarly, the integrated transmission cable 31 can be designed as the following implementation (not shown by the figures). One end of the integrated transmission cable 31 is directly fixedly connected to the audiovisual broadcast unit 2 (namely, the integrated transmission cable 31 and the audiovisual broadcast unit 2 are a single structure), and the other end of the integrated transmission cable 31 has a plug 312 for plugging into the integrated output socket 141 of the audiovisual capturing unit 1.

Second Embodiment

Figure 5:
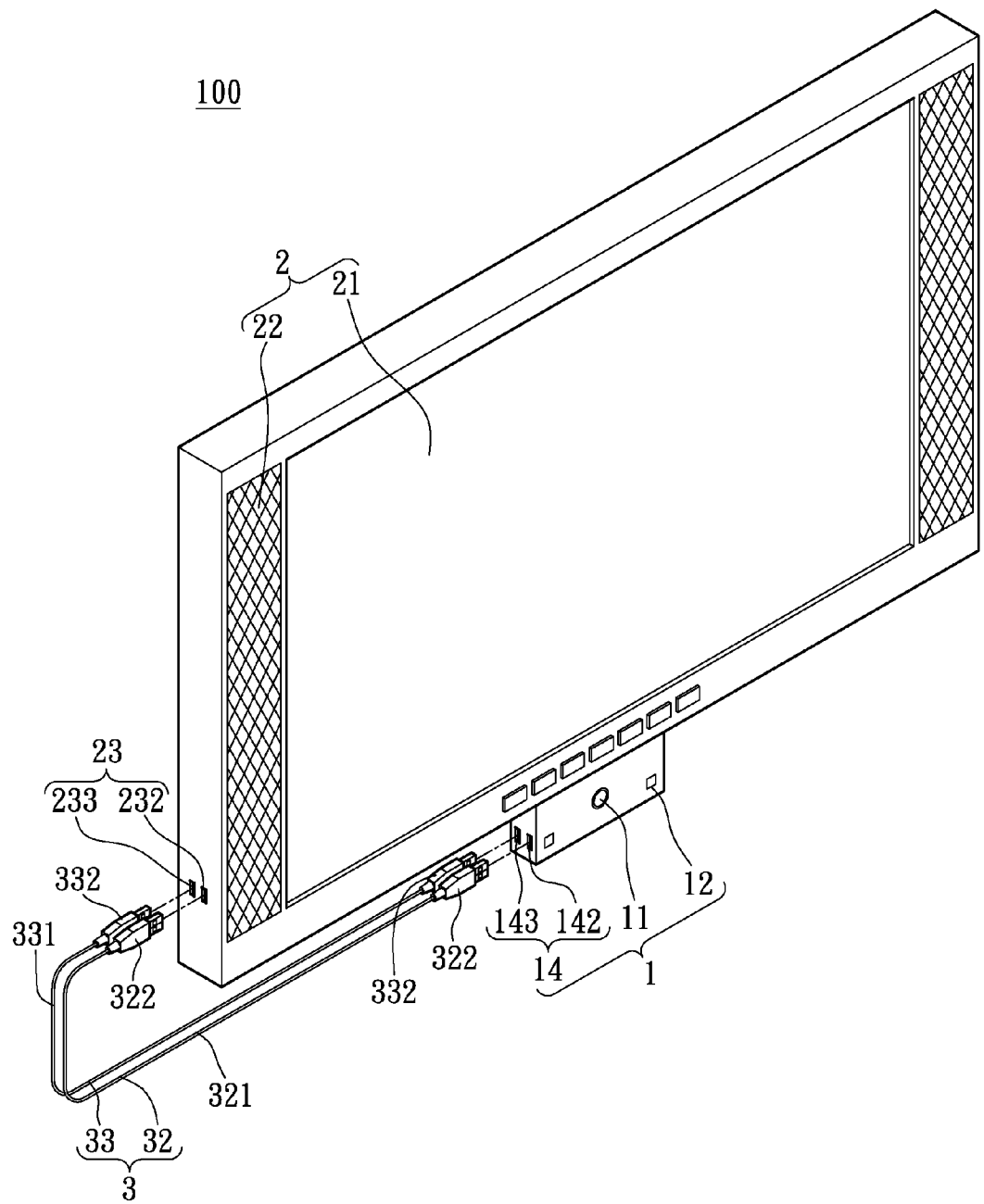
FIG. 5 shows a perspective schematic diagram of an audiovisual apparatus for reducing echo of the present disclosure according to a second embodiment.
Figure 6:
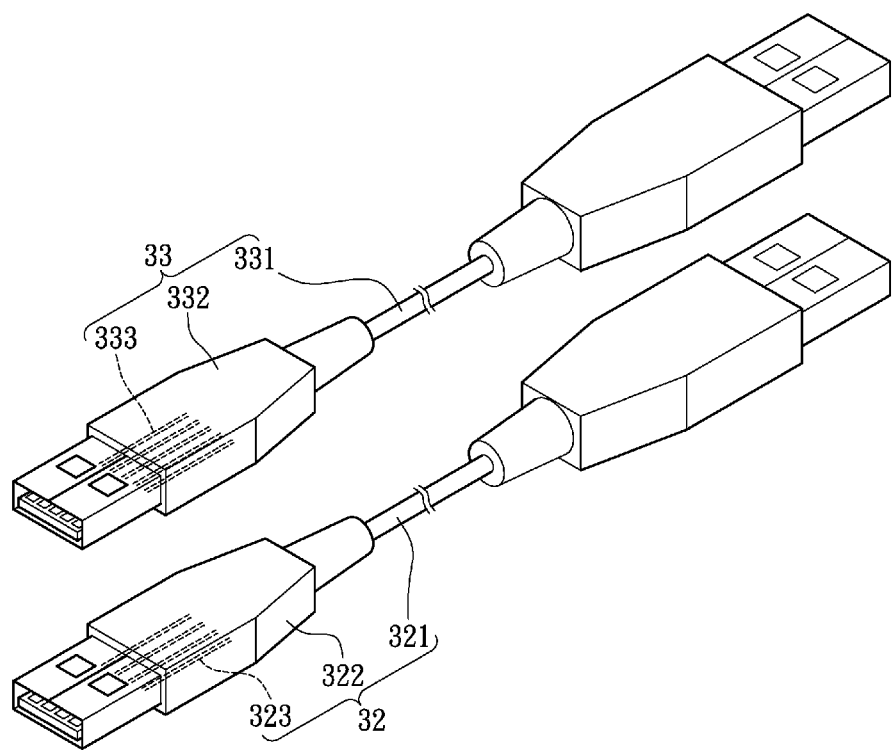
FIG. 6 shows a partial perspective schematic diagram of an audiovisual apparatus for reducing echo of the present disclosure according to a second embodiment.

FIG. 1, FIG. 5 and FIG. 6 illustrate the second embodiment of the present disclosure. FIG. 5 is a perspective schematic diagram of the present embodiment. FIG. 6 is a partial perspective schematic diagram of the present embodiment.

The present embodiment is similar to the first embodiment. The similarities are not repeated herein. The main differences between the two embodiments are: the output port 14 of the audiovisual capturing unit 1, the input port 23 of the audiovisual broadcast unit, and the transmission cable module 3.

Specifically, the output port 14 of the audiovisual capturing unit 1 has a video output socket 142 and an audio output socket 143, and the input port 23 of the audiovisual broadcast unit 2 has a video input socket 232 and an audio input socket 233.

The method of coupling video input socket 232 and the audio input socket 233 to the digital signal processor 131 and codec 132 can be adjusted to the need of the designer.

For example, the video output socket 142 and the audio output socket 143 can both be electrically connected to the digital signal processor 131. Alternatively, the video output socket 142 is electrically connected to the digital signal processor 131, and the audio output socket 143 is electrically connected to the codec 132.

The transmission cable module 3 has a video transmission cable 32 and an audio transmission cable 33. The two ends of the video transmission cable 32 are respectively plugged to the video output socket 142 and the video input socket 232. The two ends of the audio transmission cable 33 are respectively plugged to the audio output socket 143 and the audio input socket 233.

In further detail, the video transmission cable 32 includes an insulating coat 321, two plugs 322, and a video cable group 323. The two ends of the insulating coat 321 are respectively connected to the two plugs 322. The video cable group 323 is enclosed by the insulating coat 321. The two ends of the video cable group 323 are respectively connected to the terminal in each of the two plugs 322.

It bears mentioning that the video cable group 323 of the present embodiment includes a transmission cable which is similar to that of the video cable group 313 of the first embodiment, details of which are not repeated here.

Moreover, the audio transmission cable 33 includes an insulating coat 331, two plugs 332, and an audio cable group 333. The two ends of the insulating coat 331 are respectively connected to the two plugs 332. The audio cable group 333 is enclosed by the insulating coat 331. The two ends of the audio cable group 333 are respectively connected to the terminal in each of the two plugs 332.

It bears mentioning that the audio cable group 333 of the present embodiment includes a transmission cable which is similar to that of the audio cable group 314 of the first embodiment, details of which are not repeated here. Moreover, the audio cable group 333 has more cables than the video cable group 323 does in this particular embodiment but it need not be the case.

Therefore, the two plugs 332 of the video transmission cable 32 can respectively be plugged to the video output socket 142 and the video input socket 232, and the two plugs 332 of the audio transmission cable 33 can respectively be plugged to the audio output socket 143 and the audio input socket 233, thereby connecting the audiovisual capturing device 1 and the audiovisual broadcast unit 2.

In summary, the audiovisual apparatus 100 for reducing echo utilizes the audio cable group 314 of the audio transmission cable 33 to serially transmit two groups of signals (example, left and right channels).

Moreover, since the audio cable group 314 of the audio transmission cable 33 transmits data signals and clock signals separately, and the proximal and distal signals are separated by dividing the serial stream, the serial streams can be further processed to reduce the effect of echo (for example, removing distal audio signals from proximal audio signal, to remove echo from the proximal audio signal).

Figure 7:
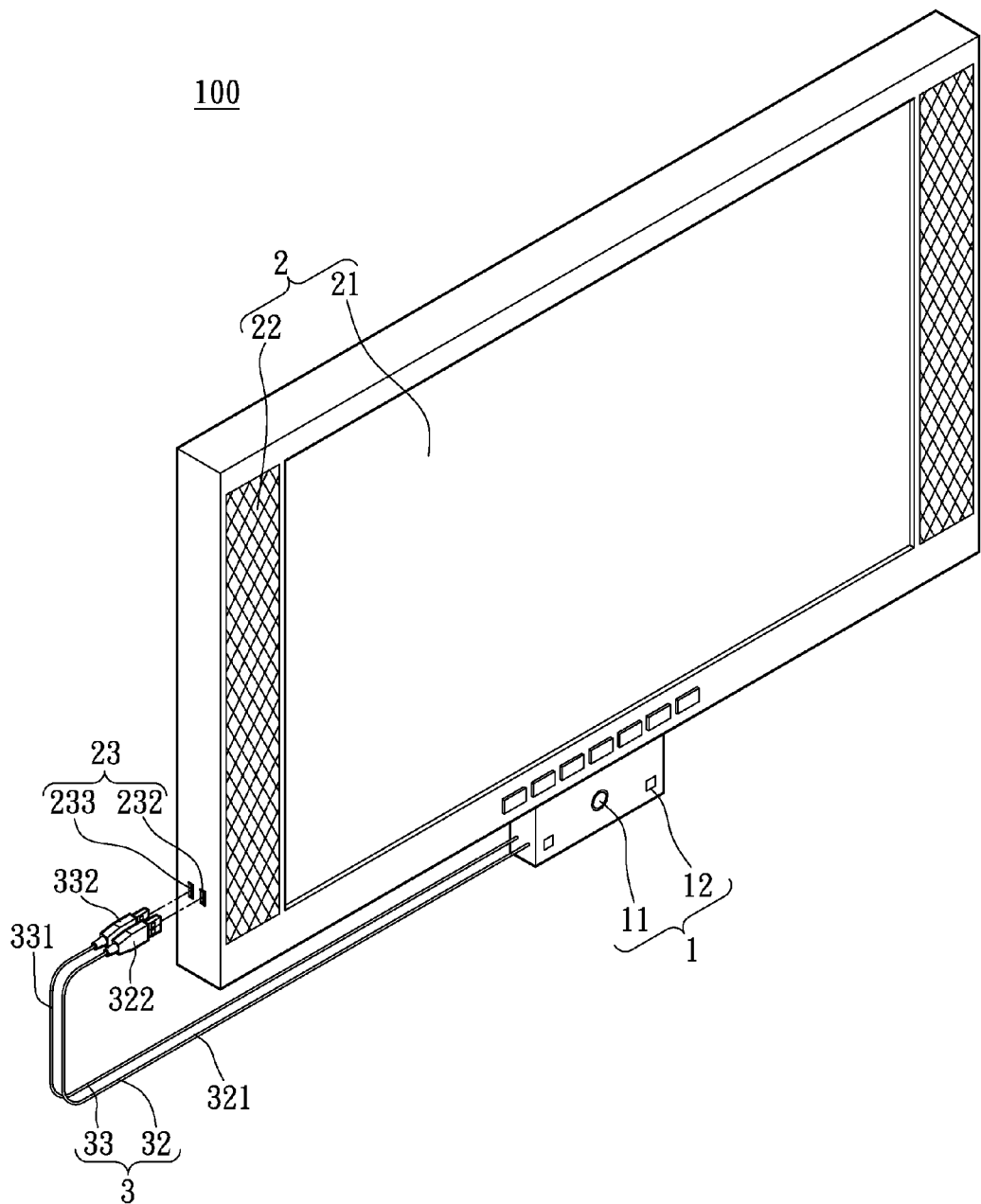
FIG. 7 shows a perspective schematic diagram of an audiovisual apparatus for reducing echo of the present disclosure according to a second embodiment under another implementation.

In addition to the above mentioned implementation of the audiovisual apparatus 100 for reducing echo, in practical application, the video transmission cable 32 and the audio transmission cable 33 may each have only one plug 312 as shown in FIG. 7 for plugging respectively into the video input socket 232 and the audio input socket 233 of the audiovisual broadcast unit 2, and have the other ends directly fixedly connected to the audiovisual capturing unit 1 (namely, the video transmission cable 32, the audio transmission cable 33, and the audiovisual capturing unit 1 are a single structure).

Similarly, the video transmission cable 32 and the audio transmission cable 33 can be designed as the following implementation (not shown by the figures). One end of the video transmission cable 32 and one end of the audio transmission cable 33 are directly fixedly connected to the audiovisual broadcast unit 2 (namely, the video transmission cable 32, the audio transmission cable 33, and the audiovisual broadcast unit 2 are a single structure), and each of the other ends of the video transmission cable 32 and the audio transmission cable 33 has a plug 312 for plugging into the integrated output socket 141 of the audiovisual capturing unit 1.

ADVANTAGES OF THE PRESENT DISCLOSURE

In summary, the audiovisual apparatus for reducing echo of the present disclosure uses an audio cable group of the transmission cable module to provide transmission of digital clock for the sound signal, clock for the left right channel switching audio signal, input serial signal, and output serial signal, in order to achieve the effect of reducing echo.

In other words, the audio cable group transmits data signals and clock signals separately, and the proximal and distal signals are separated by dividing the serial stream, thereby enabling the removal of distal audio signals from proximal audio signals in order to remove echo from the proximal audio signals.

Moreover, according to demand, the transmission cable module can be an integrated single chord, or a dual chord (namely the video transmission cable and the audio transmission cable of the embodiment).

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. An audiovisual apparatus for reducing echo, comprising:
    an audiovisual capturing unit including a video capturing unit for capturing video data, an audio capturing unit for capturing audio data, a signal processor module, and an output port,
        wherein the signal processor module has a digital signal processor and a codec electrically connected to each other, the video capturing unit is electrically connected to the digital signal processor, the audio capturing unit is electrically connected to the codec, and the digital signal processor and the codec of the signal processor module are electrically connected to the output port;
    an audiovisual broadcast unit including a video display, an audio broadcast unit, and an input port,
        wherein the video display and the audio broadcast unit are respectively coupled to the input port; and
    a transmission cable module connected between the output port of the audiovisual capturing unit and the input port of the audiovisual broadcast unit,
        wherein the transmission cable module has a video cable group for transmitting video data signals and an audio cable group for transmitting audio data signals suitable for reducing echo;
    wherein, the video cable group has a transmission cable for transmitting electric power, a pair of transmission cables for transmitting differential signal, and a transmission cable for grounding, the audio cable group comprises a transmission cable for providing a digital clock for the audio signal, a transmission cable for providing a clock when the audio signal switches between a left audio channel and a right audio channel, a transmission cable for inputting serial audio signal, and a transmission cable for outputting serial audio signal.

2. The audiovisual apparatus for reducing echo according to claim 1, wherein the output port has a video output socket and an audio output socket, the input port has a video input socket and an audio input socket, the transmission cable module has a video transmission cable and an audio transmission cable, the video transmission cable comprises the video cable group whose two ends are respectively plugged to the video output socket and the video input socket, the audio transmission cable comprises the audio cable group whose two ends are respectively plugged to the audio output socket and the audio input socket.

3. The audiovisual apparatus for reducing echo according to claim 2, wherein the video output socket and the audio output socket are both electrically connected to the digital signal processor.

4. The audiovisual apparatus for reducing echo according to claim 2, wherein the video output socket is electrically connected to the digital signal processor, and the audio output socket is electrically connected to the codec.

5. The audiovisual apparatus for reducing echo according to claim 1, wherein the output port has an integrated output socket, the input port has an integrated input socket, the transmission cable module has an integrated transmission cable, the integrated transmission cable comprises the video cable group and the audio cable group, and the two ends of the integrated transmission cable are respectively plugged to the integrated output socket and the integrated input socket.

6. The audiovisual apparatus for reducing echo according to claim 5, wherein the integrated transmission cable has an insulating coat and two plugs, the two plugs are respectively connected to the two ends of the insulating coat, each of the plugs has a first endpoint interface and a second endpoint interface disposed inside, the video cable group and the audio cable group are enclosed by the insulating coat, the two ends of the video cable group are respectively connected to the first endpoint interfaces of the two plugs, while the two ends of the audio cable group are respectively connected to the second endpoint interfaces of the two plugs, and the two plugs are respectively plugged to the integrated output socket and the integrated input socket.

7. The audiovisual apparatus for reducing echo according to claim 5, wherein the integrated output socket is electrically connected to the digital signal processor.

8. The audiovisual apparatus for reducing echo according to claim 5, wherein the integrated output sockets are respectively electrically connected to the digital signal processor and the codec.

9. The audiovisual apparatus for reducing echo according to claim 1, wherein the audio cable group further comprises a transmission cable for grounding.

* * * * *